United States Patent [19]

Ito et al.

[11] Patent Number: 4,737,787
[45] Date of Patent: Apr. 12, 1988

[54] TWO-WIRE COMMUNICATION SYSTEM

[75] Inventors: Yukio Ito, Katsuta; Kazuji Yamada, Hitachi; Yasushi Shimizu, Katsuta; Shigeyuki Kobori, Hitachi, all of Japan

[73] Assignees: Hitachi, Ltd.; Hitachi Instrument Engineering Co., Ltd., both of Tokyo, Japan

[21] Appl. No.: 919,764

[22] Filed: Oct. 16, 1986

[30] Foreign Application Priority Data

Oct. 16, 1985 [JP] Japan ................. 60-228699

[51] Int. Cl.4 ........................... G08C 19/16
[52] U.S. Cl. .................. 340/870.18; 375/5; 340/870.21
[58] Field of Search ........... 340/870.18, 39.16, 310 R, 340/310 A, 870.21, 870.19; 375/5

[56] References Cited

U.S. PATENT DOCUMENTS

| | | | |
|---|---|---|---|
| 3,959,786 | 5/1976 | Chana et al. | 340/870.39 |
| 4,339,750 | 7/1982 | Delacruz | 340/870.39 |
| 4,520,488 | 5/1985 | Houvig et al. | 340/310 R |
| 4,607,247 | 8/1986 | Sterling, Jr. et al. | 340/870.39 |
| 4,633,217 | 12/1986 | Akano | 340/870.39 |

FOREIGN PATENT DOCUMENTS 85649 6/1983 Japan.

Primary Examiner—John W. Caldwell, Sr.
Assistant Examiner—Tyrone Queen
Attorney, Agent, or Firm—Antonelli, Terry & Wands

[57] ABSTRACT

A two-wire communication system comprising a transmitting unit having constant current characteristics for controlling an output current thereof on the basis of a signal supplied from a sensor, a receiving unit for receiving a control signal to control the sensor, a load resistor and power supply connected in series with the transmitting unit via a two-wire transmission path, and a communication unit so connected in parallel to the load resistor as to convey the output current of the transmitting unit to the process side and control a current from the power supply transmitted onto the transmission path on the basis of information supplied from the process side. With this configuration, a communication system is provided which makes possible replacing process variable transmitters in a conventional analog control system or installing process variable transmitters in a new analog control system, which makes possible remotely setting and adjusting the transmitter function by the communication unit in the above described system, which makes it possible for the control computer to control as far as terminals, and which facilitates digitization of the system.

13 Claims, 7 Drawing Sheets

F I G. 1
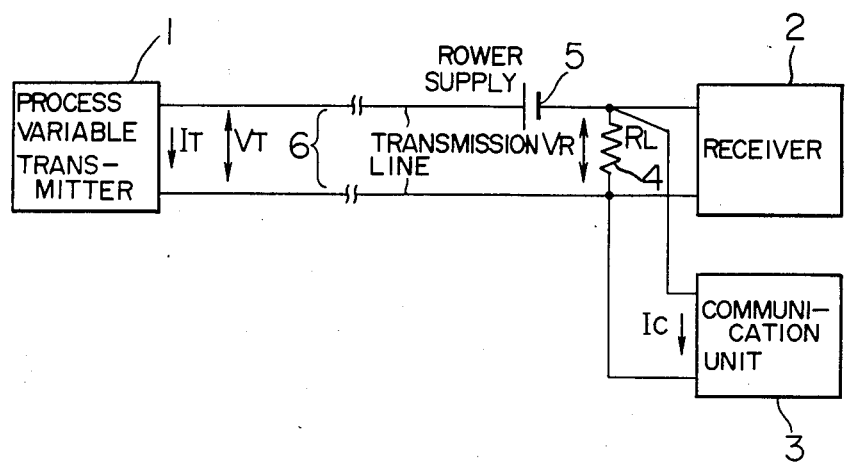
F I G. 2
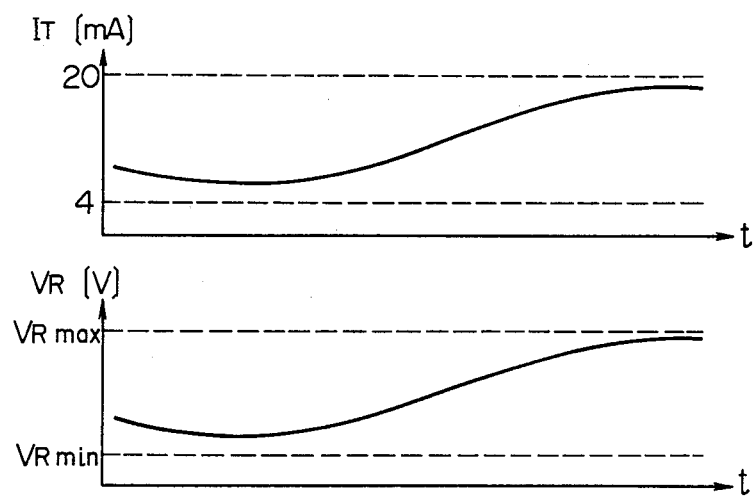

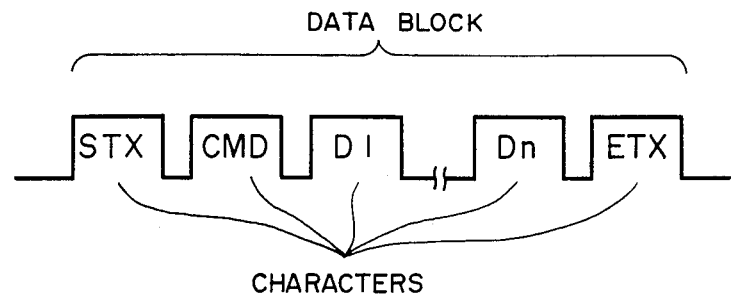
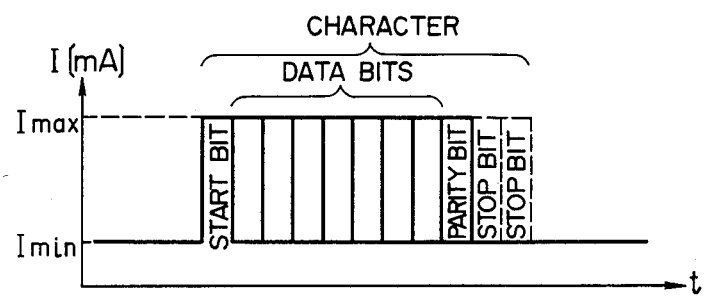
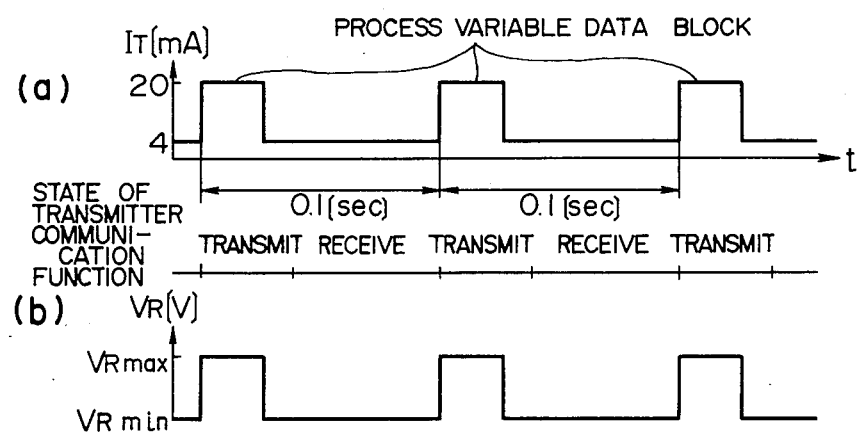

F I G. 10
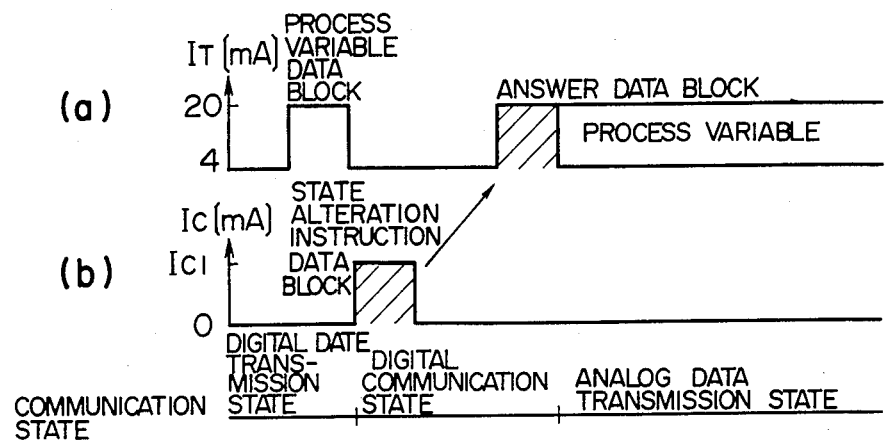
F I G. 13
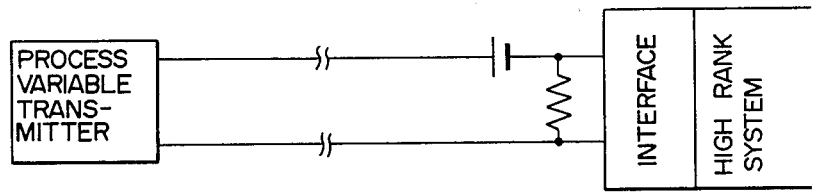
F I G. 14
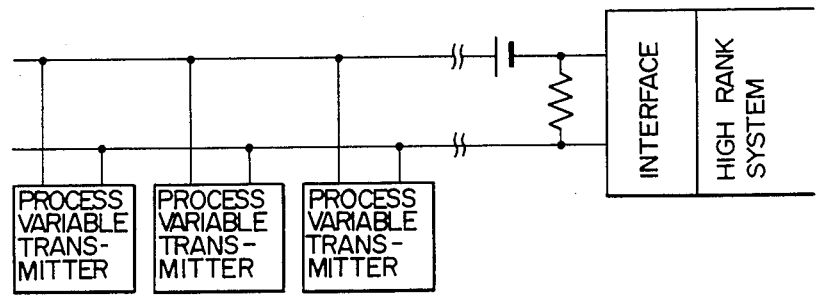

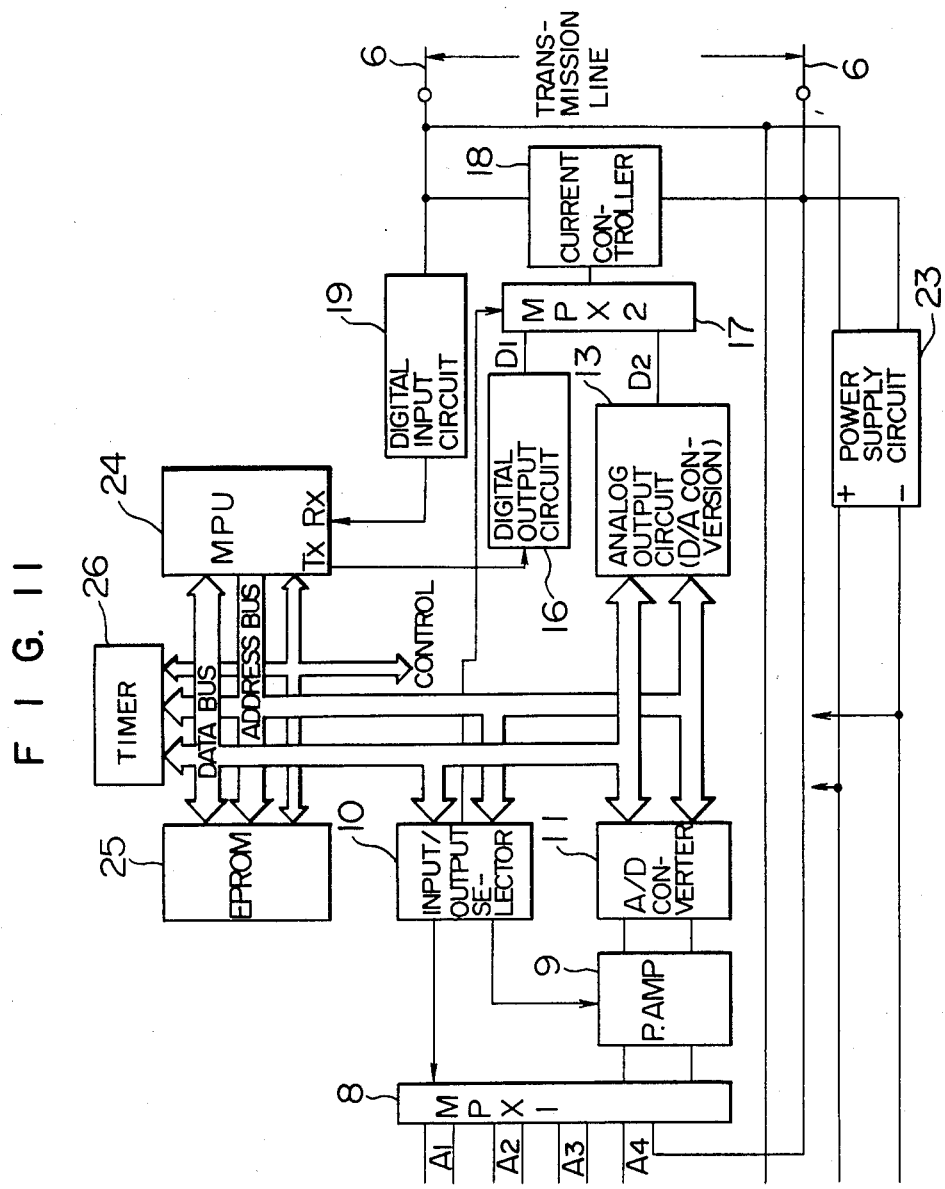

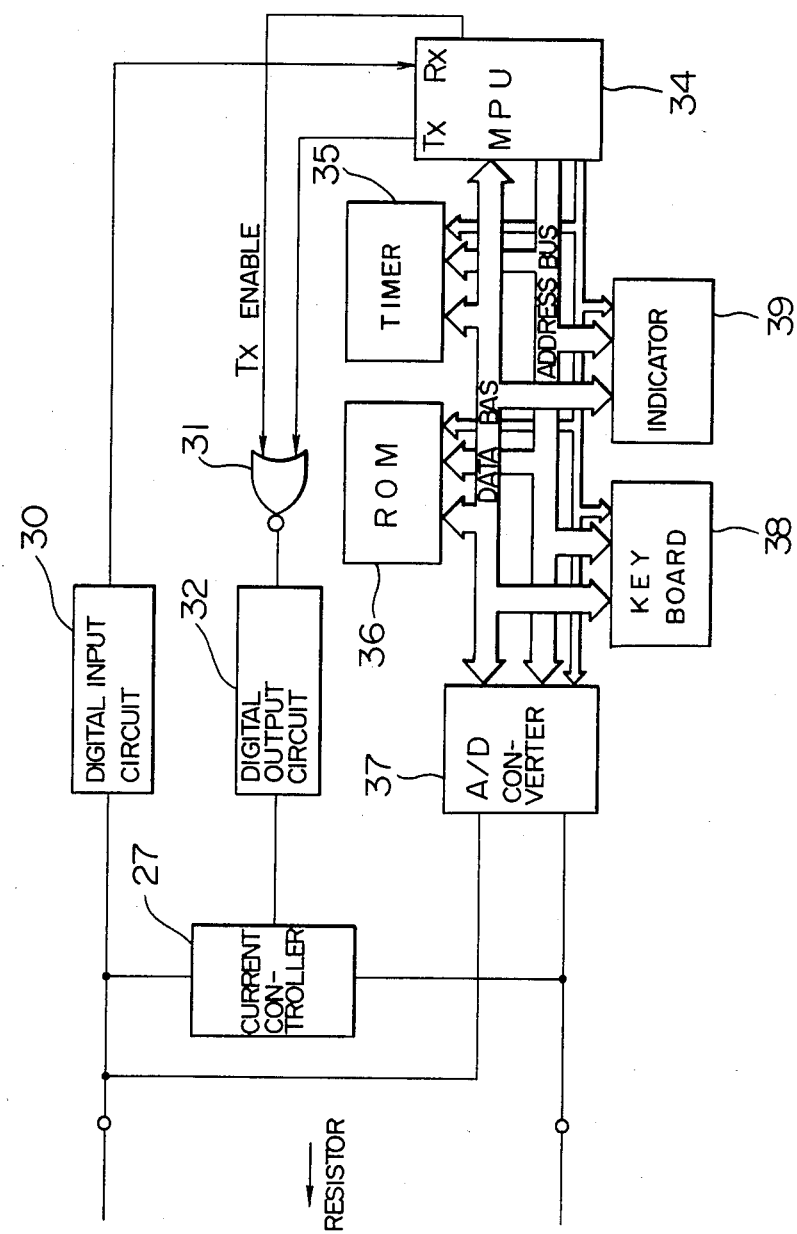
F I G. 12

TWO-WIRE COMMUNICATION SYSTEM

BACKGROUND OF THE INVENTION

The present invention relates to a two-wire communication system, and in particular to a communication system suitable for use in a data communication system or the like between field devices such as terminal process variable transmitters and a control computer of a conventional analog control system used in a plant as well as a present and future digital control system.

As a two-wire data transmission or communication system for industrial instruments such as process variable transmitters, a conventional analog data transmission system is known. In the analog data transmission system, the transmitter controls the current in a range of 4 to 20 mA. In addition to such a conventional analog data transmission system, a system as described in Japanese Patent Unexamined Publication No. 85649/83 is known. In that system, digital data and analog data are alternately transmitted. The digital data communication consists of instructions for setting and adjusting transmitter functions sent from a communication unit to transmitters and answers sent from the transmitter to the communication unit. After the analog data transmission state is replaced by the digital data transmission state, a predetermined delay is introduced and then the analog data transmission state is resumed. This system is effective when a user adjusts and sets the transmitter function in a communication system for analog data transmission. However, the base state of this system is the analog data transmission state, and a system for transmitting the process variable signal as digital data from a transmitter to a receiver or a high rank computer is not described. In addition, the communication unit of the above described system is susceptible to external disturbance or a change in voltage of the power supply because the communication unit is connected in parallel to the power supply, a resistor and a transmitter. Further, the receiver is connected in parallel to a resistor and is different from the communication unit in connection position. This results in lack of uniformity in view of interface to a high rank system in the future.

SUMMARY OF THE INVENTION

An object of the present invention is to provide a communication system which makes possible replacing process variable transmitters in a conventional analog control system or installing process variable transmitters in a new analog control system, which makes possible remotely setting and adjusting the transmitter function by the communication unit in the above described system, which makes it possible for the control computer to control as far as terminals, and which facilitates digitization of the system.

The present invention is based upon a concept that the future communication system for the process variable transmitter will be transferred from the analog data transmission system to a digital data transmission system facilitating transmission of higher precision, higher reliability and higher degree of multiplex. In accordance with the present invention, an analog data transmission state applicable to a conventional analog control system, a digital data transmission state applicable to a digital control system, and a digital communication state making possible remote setting and adjustment from a high rank computer through a communication unit or an interface are provided, and transfer from both transmission states to the digital communication state is permitted.

BRIEF DESCRIPTION OF THE DRAWINGS

FIG. 1 shows a block diagram illustrating an embodiment of the present invention.

FIG. 2 shows transmitted and received waveforms in the analog data transmission state.

FIG. 3 shows the configuration of a digital data block.

FIG. 4 shows the bit configuration of characters constituting the data block of FIG. 3.

FIG. 5 shows transmitted and received waveforms of the digital data transmission state and the state of transmitter communication function.

FIG. 10 shows transmitted waveforms for illustrating a method whereby the state of FIG. 9 is altered to the analog data transmission state.

FIG. 11 shows the functional block diagram of a process variable transmitter for illustrating an embodiment of the present invention.

FIG. 12 shows the functional block diagram of a communication unit for illustrating an embodiment of the present invention.

FIG. 13 shows a block diagram for illustrating the connection between a proces variable transmitter and a high rank system as a developed form utilizing the present invention.

FIG. 14 shows a block diagram for illustrating the multiplexing of the two-wire data transmission as a developed form utilizing the digital data transmission state of the present invention.

DESCRIPTION OF THE PREFERRED EMBODIMENTS

Figure 6:
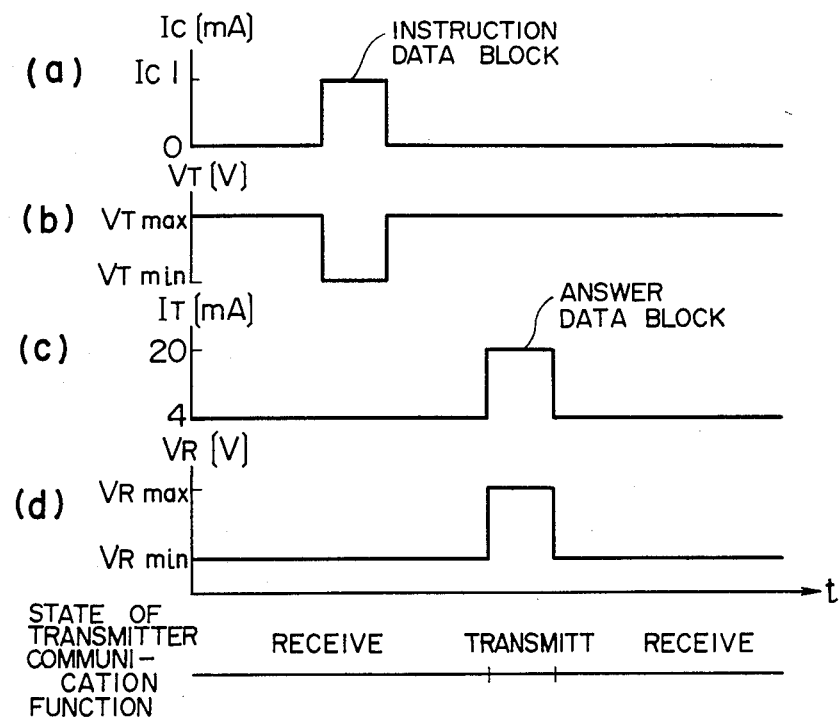
FIG. 6 shows transmitted and received waveforms in the digital communication state.

An embodiment of the present invention will now be described with reference to the drawings. FIG. 1 shows a block diagram which is an embodiment of a communication system according to the present invention. A process variable transmitter 1 is supplied with power from external power supply 5 through a resistor 4 having a value $R_L$. A current $I_T$ forms the output signal of the process variable transmitter 1. A receiver 2 or a communication unit 3 is connected in parallel to the resistor 4. Under this state, power is supplied from the power supply to the process variable transmitter by using a transmission line 6. At the same time, data communication is conducted between the process variable transmitter and the communication unit, and data is transmitted from the process variable transmitter to the receiver. In FIG. 1, the terminal voltage and output current of the process variable transmitter 1 are represented by $V_T$ and $I_T$, respectively. The terminal voltage of the resistor ($R_L$) 4 and the output current of the communication unit 3 are represented by $V_R$ and $I_C$, respectively. The basic function of each block will now be described. At first, the process variable transmitter has constant current characteristics and operates with a current of 4 mA derived through the transmission line. The process variable transmitter has an analog data transmission function and a digital data transmission/receiving function. The process variable, such as pressure and temperature undergoes compensation processing in a microprocessor included in the process variable transmitter 1. The signal thus converted into a suitable form is transmitted as data through the transmission line. Further, the process variable transmitter 1 receives digital data transmitted from the communication unit to process the digital data in the above described microprocessor and answers with digital data. The receiver is an analog data receiver or a digital data receiver and receives and indicates data. These are selected and installed by the user. The communication unit 3 has an analog data receiving function, a digital data transmitting/receiving function, data setting function, data indication function, and function for altering the communication state of the process variable transmitter. The whole system shown in FIG. 1 is entirely controlled by the command of the operator through the communication unit. If the system is directly connected to a high rank computer rather than the communication unit in the future, the system is controlled by the high rank computer.

In view of communication function, there are three kinds of communication state:

(1) Analog transmission state by means of 4–20 mA DC from the process variable transmitter to the receiver.

(2) Digital transmission state by means of serial pulses from the variable transmitter to the receiver.

(3) Digital communication state by means of serial pulses between the process variable transmitter and the communication unit.

These three kinds of communication state will now be described by referring to FIGS. 1 to 6. At first, the analog data transmission state of (1) will be described with reference to FIG. 2. Under this state, the process variable transmitter transmits analog data by controlling the output current $I_T$ in the range of 4 to 20 mA in response to the process variable. The output current $I_T$ is transmitted through the transmission line and undergoes I/V conversion by the resistor $R_L$ to be detected by the receiver. FIG. 2 shows $I_T$ and $V_R$ as functions of time. Values $V_{Rmax}$ and $V_{Rmin}$ can be represented as:

$$V_{Rmax} = I_{Tmax} [A] \times R_L [\Omega]$$
$$= 20 \cdot R_L [V]$$
$$V_{Rmin} = I_{Tmin} [A] \times R_L [\Omega]$$
$$= 4 \cdot R_L [V]$$

This state is the same as that of the conventional analog data transmission system and will not be described in detail.

Prior to describing the digital data transmission state of (2) and the digital communication state of (3), the data structure of digital data used in the states of (2) and (3) will be described with reference to FIGS. 3 and 4. Data representing one process variable, instruction or answer data is treated as one data block (text) having a series of characters STX, CMD, data and ETX. The character STX is a transmission control character for indicating the beginning of the text. The character CMD indicates the kind of data. Characters $D_1$ to $D_n$ are transmission data characters. The character ETX is a transmission control character for indicating the termination of the text. FIG. 4 shows the bit structure of each character. This data format conforms to JISC 6220 and its detailed description will be omitted. The transmission method of digital data will now be described with reference to FIGS. 1 and 4. Transmission of digital data is effected by controlling the output currents $I_T$ and $I_C$ in the process variable transmitter 1 and the communication unit 3, respectively. Digital data is transmitted by changing the current in pulse form so that the digital data "1" and "0" may correspond respectively to $I_{min}$ and $I_{max}$ in FIG. 4, for example. Such change in current undergoes I/V conversion to be detected as a change in voltage by the receiver 2 or the communication unit 3. That is to say, the change in output currents $I_T$ or $I_C$ is converted into a voltage change via one resistor ($R_L$) 4 connected in series with the transmission line. The change in output current $I_T$ is received as a change in $V_R$ by the receiver 2 or the communication unit 3, and a change in output current $I_C$ is received as a change in $V_T$ by the process variable transmitter 1. As a result, serial data pulses are obtained.

By using the above described basic digital data structure and transmission/receiving method, digital data transmission and digital data communication are conducted. The digital data transmission state will now be described in detail with reference to FIG. 5. Under this state, the process variable transmitter periodically transmits the process variable as digital data. As shown in FIG. 5(a), the process variable transmitter transmits digital data by controlling the output current $I_T$ in a predetermined current range, say, 4 to 20 mA so that the digital data "1" and "0" may correspond to 4 mA and 20 mA, respectively. Since the minimum operation current necessary for the process variable transmitter is 4 mA, the minimum current of the digital current signal is 4 mA. One process variable is transmitted as one data block. Data blocks are transmitted one after another at a predetermined transmission period, say, 0.1 sec. As shown in FIG. 5(b), each data block is received as a change in the terminal voltage $V_R$ across the resistor 4 by the receiver 2 or the communication unit 3, resulting in serial data pulses. As shown in FIG. 5(a), the digital data transmission/receiving function of the process variable transmitter assumes the receiving state between blocks and assumes the transmission state during the transmission of each data block. By using this receiving state, combination with the communication state described later becomes possible. In the receiving state, the output current $I_T$ is fixed at a preset value, say, 4 mA.

The digital communication state will now be described with reference to FIGS. 1 and 6. Under the digital communication state, the communication unit 3 transmits the function setting and adjusting instruction of the process variable transmitter 1 to the process variable transmitter 1 by using one data block. Under the digital communication state, the process variable transmitter 1 also transmits the answer to the above described instruction to the communication unit 3 by using a flow data block. The communication unit 3 transmits digital data by controlling the output current in a predetermined current range 0 to $I_{C1}$ so that digital data "1" and "0" may correspond to 0 mA and $I_{C1}$, respectively. The instruction data block shown in FIG. 6(a) is received as a change in the terminal voltage $V_T$ of the process variable transmitter by the process variable transmitter 1 as shown in FIG. 6(b), resulting in serial data pulses. The process variable transmitter 1 conducts processing in obedience to the instruction data in the microprocessor thereof. The process variable transmitter 1 transmits the answer data block as one data block to the communication unit 3 by using the same method as the above described transmission method of the digital data transmission state. Under this communication state, the communication function of the process variable transmitter 1 assumes the receiving state and waits for the instruction from the communication unit. This time, $I_T$ is fixed at a predetermined current value, say, 4 mA.

Three communication states have heretofore been described. A communication system having the analog data transmission state and a state comprising a combination of the digital data transmission state and the digital communication state belonging to the three communication states will now be described together with an embodiment of a method for changing over between the two communication states. At first, the analog data transmission state is the same as that described before with reference to FIG. 2. A method for altering the analog data transmission state will now be described by referring to FIGS. 1, 7 and 8. Until time $t_1$ of FIG. 7, the process variable transmitter 1 assumes the conventional analog data transmission state, and $V_T$ is in a voltage range between $V_{Tmin}$ and $V_{Tmax}$. During a predetermined period $t_c$ starting from the time $t_1$, a current $I_{C1}$ is allowed to flow from the communication unit 3 into the resistor 4 to keep $V_T$ in a voltage range between $V_{T0}$ and $V_{Tmin}$. The relationship between $I_T$ and $V_T$ under this state and the relationship between $I_T$ and $V_T$ before $t_1$ will now be described by referring to FIG. 8. When $t < t_1$, the relationship between $I_T$ and $V_T$ is represented by a straight line (a) denoted by $I_C = 0$ mA. When $t_1 < t < t_2$, the relationship between $I_T$ and $V_T$ is represented by a straight line (b) denoted by $I_C = I_{C1}$. That is to say, a voltage difference $\Delta V = I_{C1} \cdot R_L$ is produced in $V_T$ for the identical value of $I_T$. The process variable transmitter compares the relationship between $I_T$ and $V_T$ derived as the initial state beforehand with the actual value of $V_T$. When the process variable transmitter has recognized that $\Delta V$ exceeds the threshold $\Delta V_{TH}$ for a predetermined period, it terminates the analog data transmission state and resumes the combined state of the digital data transmission and digital communication.

Figure 9:
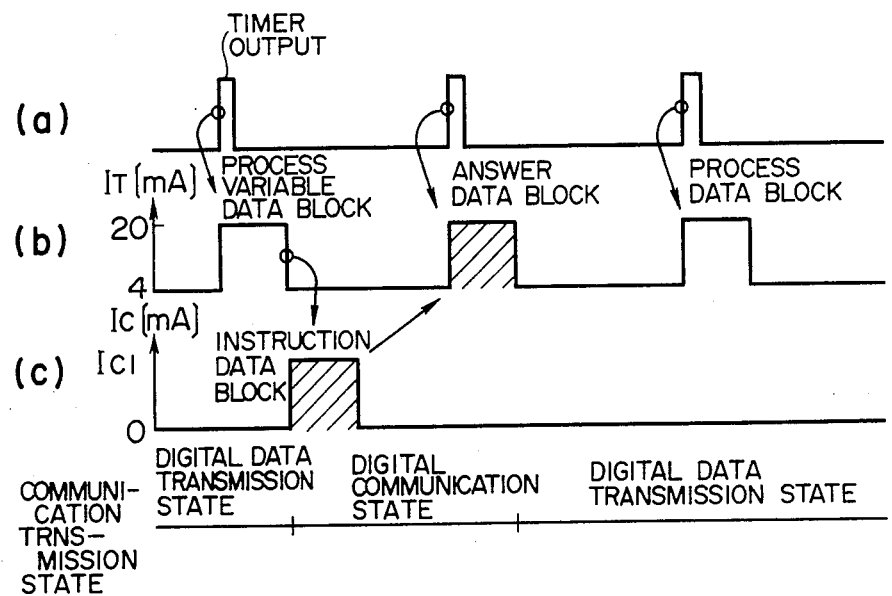
FIG. 9 shows transmitted waveforms in a state comprising a combination of the digital data transmission state and the digital communication state.

The state comprising a combination of the digital data transmission and digital communication will now be described by referring to FIG. 9. As shown in (a) and (b) of FIG. 9, the transmission period of the process variable transmitter 1 is set by a timer, and process variable data blocks are transmitted in synchronism with the output of the timer. When the communication unit 3 is to transmit the instruction, the communication unit 3 receives a data block from the process variable transmitter 1 and transmits an instruction data block in synchronism with the termination of the data block from the process variable transmitter 1. There are various synchronization methods for assuring that the instruction data block reaches the process variable transmitter without being confused with the process variable data block. In the present system, however, the communication unit transmits the instruction data block in synchronism with the termination of the data block. In the present system, therefore, the interval between data transmitted by the process variable transmitter 1 must be sufficiently longer than the data length transmitted by the communication unit 3. At this time, the instruction data is transmitted by the method described before with reference to FIG. 6. When the communication unit 3 transmits an instruction data block, the communication function of the transmitter assumes the receiving state and the transmitter receives the instruction data block transmitted by the communication unit as described before with reference to FIG. 5. The microprocessor included in the process variable transmitter 1 effects processing depending upon the instruction, and transmits the answer data block instead of a process variable data block in synchronism with the transmission period of digital data. The transmission method at this time is the same as that described before with reference to FIG. 6. If the instruction from the communication unit 3 is not present thereafter, the process variable transmitter 1 transmits process variable data blocks again with the period T.

A method for altering the state comprising a combination of digital data transmission and digital communication will now be described by referring to FIG. 10. The case where a state alteration instruction data block is transmitted as the instruction data block of FIG. 9 corresponds to FIG. 10. The data transmission/receiving method is the same as that described before with reference to FIG. 9. After the process variable transmitter 1 has answered the communication unit 3, the communication state is transferred to the analog transmission state.

FIGS. 11 and 12 are respectively block diagrams showing the basic configuration of the process variable transmitter 1 and the communication unit 3 satisfying the above described three communication states and the function of the embodiment. At first, the configuration and function of the process variable transmitter 1 as well as its relationship to the embodiment will be described by referring to FIG. 11.

A plurality of process variables such as pressure, differential pressure and temperature are sensed by a composite sensor 7. An analog input supplied from the composite sensor 7 is selected by a directive from the input/output selector 10 and is amplified in a programmable amplifier 9 with a gain directed by the input/output selector 10. The data which has undergone A/D conversion in an A/D converter is subjected to compensatory arithmetic processing in an MPU 24 handling the overall operation of the process variable transmitter centering around the calculation and communication processing. The data thus arithmetically processed reaches a multiplexer (MPX 2) 17 through an analog output circuit 13 including a D/A converter or through an MPU 24, serial interface, and a digital output circuit 16. Upon the directive of the input/output selector, the MPX 17 selects data to be supplied to a current controller 18. The current controller 18 including a voltage-to-current conversion circuit controls the output current on the basis of the input. The digital input circuit 19 receives digital data transmitted from the communication unit 3 and supplies the digital data to a serial interface of an MPU 24. The input/output selector 10 functions to latch the directive from the MPU and output it. An EPROM 25 stores the characteristics data and program of compensation calculation therein. A timer 26 provides a predetermined operation period.

Figure 7:
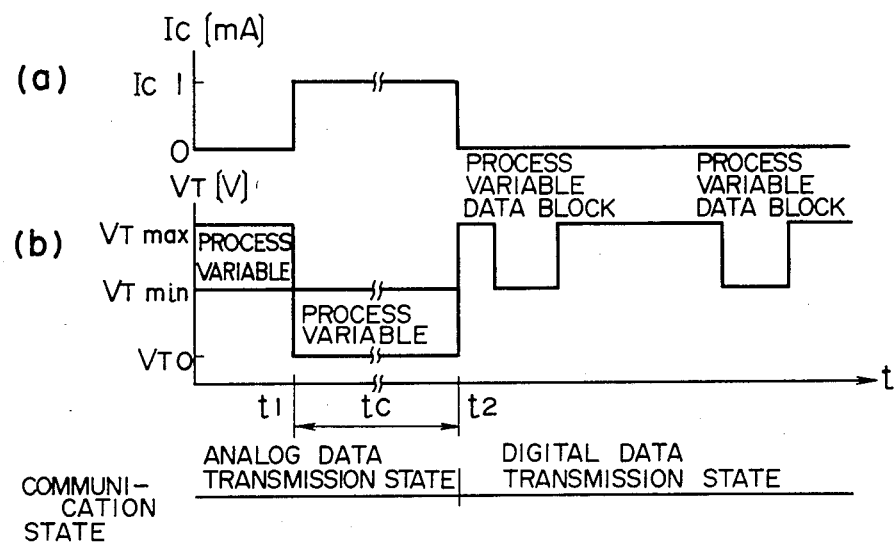
FIG. 7 shows transmitted and received waveforms for illustrating the method whereby the analog data transmission state is altered.
Figure 8:
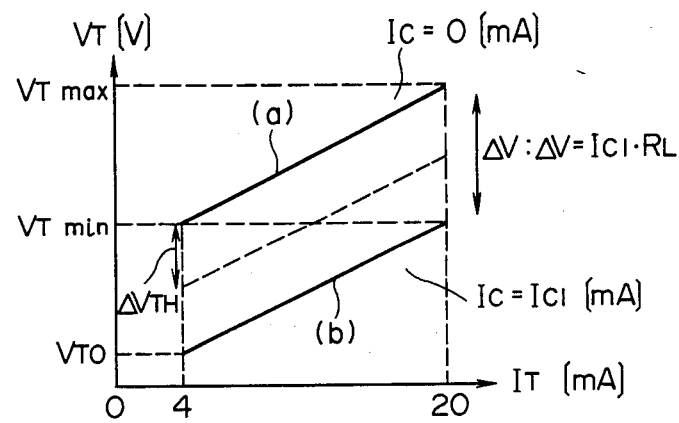
FIG. 8 shows the relationship between $I_T$ and $V_T$.

Under the analog data transmission state, the MPU 24 supplies data to the analog output circuit, and selects D2 as the input to the MPX 17 through the input/output selector. The change $\Delta V$ in terminal voltage of the process variable transmitter as shown in FIGS. 7 and 8 is measured by periodically selecting an A4 input of the MPX 8 and applying A/D conversion to $V_T$. Under the digital data transmission state, the MPU 24 sends out data through the serial interface thereof and selects D1 as the input of the MPX 17 via the input/output selector 10.

The configuration and function of the communication unit 3 as well as its relationship to the embodiment will now be described by referring to FIG. 12. The directive from the operator is taken into an MPU 34 through a keyboard 38. The data constructed by the MPU 34 on the basis of the directive arrive at a current controller 27 through the serial data interface of the MPU 34 and a digital output circuit 32. The current controller 27 including a voltage-to-current converter circuit controls the output current in response to its input. A digital input circuit 30 receives the digital data transmitted from the process variable transmitter and supplies its output to the serial interface of the MPU 34. An A/D converter 37 is supplied with the terminal voltage across the resistor 4 caused by the analog data transmitted from the process variable transmitter 1 and supplies the converted digital data to the MPU 34. A ROM 36 stores a program therein and a timer 35 provides a predetermined operation period. An indicator 39 displays input data supplied from the operator and data transmitted from the process variable transmitter 1. When the process variable transmitter 1 assumes the analog data transmission state, the MPU 34 receives data through the A/D converter 37 and the timer 35 provides the receiving period. When the process variable transmitter 1 assumes the digital data transmission state, the MPU 34 receives data through the digital input circuit 30. When the process variable transmitter 1 assumes the digital communication state, data is sent out through the digital output circuit 32, and the answer data is received through the digital input circuit 30. The lead "Tx enable" is usually kept at the low level. The condition $I_C = I_{C1}$ during the period $t_c$ for altering the analog data transmission state is satisfied by making the lead "Tx enable" the high level during the period $t_c$. The period $t_c$ is given by the timer.

A developed form of the communication system using the three communication states will now be described with reference to FIGS. 1, 13 and 14. In FIG. 13, a high rank system is connected to the process variable transmitter through an interface having the transmission/receiving function similar to that of the communication unit 3. Thus the digital communication between the high rank computer in the system and the process variable transmitter becomes possible. FIG. 14 shows a system having a plurality of process variable transmitters connected to a two-wire transmission line in parallel. In this system, multiplex operation becomes possible under the digital data transmission state by applying the time division scheme to the transmission period shown in FIG. 5 and adding the address of each transmitter to the process variable data block.

In the present embodiment, the process variable transmitter using the present two-wire communication method can be used for replacement in the conventional analog control system and can be easily adapted to the future digital control system. Further, in the conventional analog control system as well, the process variable transmitter can be remotely set and adjusted by altering the communication state. Since the communication unit is connected in parallel to the resistor, the data reception by the communication unit is not susceptible to variation in supply voltage and external disturbance, and both analog data and digital data can be received. If the signal produced when the state is transferred from the analog data transmission state to another state is a pulse signal, there is a possiblity of erroneous operation due to disturbance noise. In the present system as shown in FIGS. 7 and 8, however, there is not much possibility of erroneous operation. If the two-wire multiplexing as shown in FIG. 14 is used, the wiring process can be simplified and the cost can be reduced.

Effects of the present invention will now be summarized. The process variable transmitter according to the communication system of the present invention can be used in the conventional analog control system. In addition, the process variable transmitter can be easily maintained by using the digital communication state. Further, it is possible to easily cope with the digitization of the high rank system by altering the communication state and installing a simple interface as occasion demands. Thus the cost when the system is developed can be reduced. By using the digital data transmission state and digital communication state, it is possible in the digital control system to collect data from all field terminal devices such as process variable transmitters to a central supervision room and supervise and manage the collected data there, resulting in an efficient digital control system. Also the processor variable transmitter according to the communication system of the present invention is effective for communication whereby the output signal is derived while power is being supplied to a sensor, i.e., sensor base communication.

We claim:

1. A two-wire communication system comprising:
   a two-wire transmission path;
   a transmitting unit having a constant current characteristic and connected to one end of said path, and also being connected to receive a process variable signal;
   a series circuit formed by the connection of a load resistor and a power supply, said series circuit being connected to the other end of said path such that said resistor and power supply are connected in series with the transmitting unit via said path; and
   a communication unit connected in parallel to said resistor;
   wherein said transmitting unit includes digital processing means for processing said process variable signal and for providing on said path periodic digital current signal blocks as a result of said processing, and first digital communication means for digitally communicating with the communication unit over said path; and
   wherein said communication unit includes means for receiving said periodic digital current signal blocks from said transmitting unit and second digital communication means for digitally communicating with said transmitting unit over said path.

2. A two-wire communication system as claimed in claim 1, wherein any one of the digital processing means and first digital communication means is selectively operable in response to communication from the communication unit.

3. A two-wire communication system as claimed in claim 2, wherein said second digital communication means includes means for issuing on the path a digital current signal block following receipt of a digital current signal block from said transmitting unit, the intervals between said periodic digital current signal blocks provided by said transmitting unit being longer than the duration of the digital current signal block issued by said communication unit.

4. A two-wire communication system as claimed in claim 3, wherein the digital current signal block issued by said communication unit is interposed between the digital current signal blocks provided by said transmitting unit.

5. A two-wire communication system comprising:
a two-wire transmission path;
a transmitting unit having a constant current characteristic and connected to one end of the path, and also being connected to receive a process variable signal;
a series circuit formed by the connection of a load resistor and a power supply, said series circuit being connected to the other end of said path such that said resistor and power supply are connected in series with the transmitting unit via said path; and
a communication unit connected in parallel to said resistor;
wherein said transmitting unit includes analog processing means for processing said process variable signal and for providing an analog current signal to said path as a result of said processing, digital processing means for processing said process variable signal and for providing on said path periodic digital current signal blocks as a result of said processing, and first digital communication means for digitally communicating with the communication unit over said path; and
wherein said communication unit includes means for receiving said analog current signal and said periodic digital current signal blocks from said transmitting unit and second digital communication means for digitally communicating with said transmitting unit over said path.

6. A two-wire communication system as claimed in claim 5, wherein any one of the analog processing means, digital processing means and first digital communication means is selectively operable in response to communication from the communication unit.

7. A two-wire communication system as claimed in claim 6, wherein said communication unit includes means for producing a current pulse of a predetermined amplitude and pulse width to change a voltage developed across said resistor by said transmitting unit, and wherein the transmitting unit includes means responsive to detection of the voltage change across said resistor for inactivating the analog processing means and activating either the digital processing means or the first digital communication means.

8. A two-wire communication system as claimed in claim 6, wherein said second digital communication means includes means for issuing on the path a digital current signal block following receipt of a digital current signal block from said transmitting unit, the intervals between said periodic digital current signal blocks provided by said transmitting unit being longer than the duration of the digital current signal block issued by said communication unit.

9. A two-wire communication system as claimed in claim 8, wherein the digital current signal block issued by said communication unit is interposed between the digital current signal blocks provided by said transmitting unit.

10. A two-wire communication system comprising:
a two-wire transmission path;
a transmitting unit having a constant current characteristic and connected to one end of said path, and also being connected to receive a process variable signal;
a series circuit formed by the connection of a load resistor and a power supply, said series circuit being connected to the other end of said path such that said resistor and power supply are connected in series with the transmitting unit via said path; and
interface means connected in parallel to the resistor, for interfacing the transmitting unit and a high-rank system to be connected to the interface means;
wherein the transmitting unit includes analog processing means for processing said process variable signal and for providing on said path an analog current signal and current signal blocks as a result of said processing, and digital communication means for effecting two-way digital communication with the high-rank system via said interface means.

11. A two-wire communication system according to claim 10, further comprising at least one additional process variable transmitting unit connected to said one end of said path.

12. A two-wire communication system according to claim 11, wherein an address is given to each of said process variable transmitting units.

13. A two-wire communication system according to claim 11, wherein said process variable transmitting units are connected in parallel to said path.

* * * * *